FIG. 1
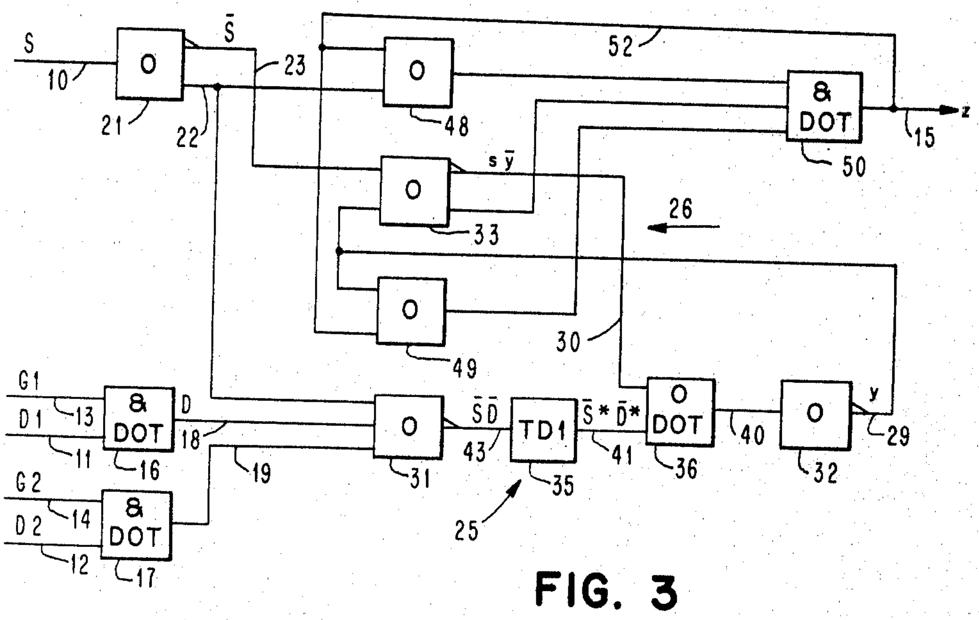
FIG. 3
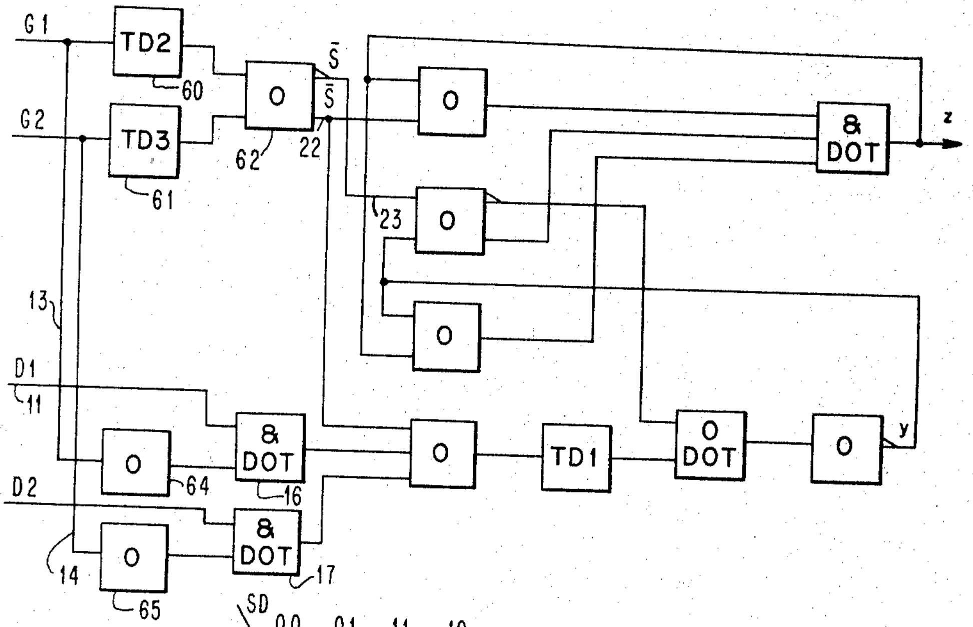
FIG. 2
| zy \ SD | 00 | 01 | 11 | 10 |
|---|---|---|---|---|
| 00 | (00) | 01 | (00) | (00) |
| 01 | 00 | (01) | 11 | 11 |
| 11 | 10 | (11) | (11) | (11) |
| 10 | (10) | 11 | 00 | 00 |
ZY
INVENTORS
GILBERT R. MUHLENBRUCH
RONALD WAXMAN
BY W. G. Robertson
ATTORNEY United States Patent Office
3,413,557
Patented Nov. 26, 1968

3,413,557

GATED STROBING LATCH FOR SYNCHRONIZING DATA IN AN ASYNCHRONOUS SYSTEM

Gilbert R. Muhlenbruch, Wappingers Falls, and Ronald Waxman, Poughkeepsie, N.Y., assignors to International Business Machines Corporation, Armonk, N.Y., a corporation of New York Filed July 2, 1965, Ser. No. 469,205
8 Claims. (Cl. 328—92)

This invention relates generally to a data storage device that is called a gated latch, more specifically to a gated latch having an output that is synchronized with a controlling input signal called a strobe pulse.

An example of a simplified gated latch will help introduce the objects and features of this invention and some of the terminology that will be used. A latch is a sequential circuit with two inputs that will be called data and strobe and with a binary output. For one value of the strobe input, the latch output is a function of the data input; for the other strobe value, feedback circuits are set up in the latch that maintain the output at its existing value independently of changes that may then occur at the data input. In a typical application, a gated latch stores the output of an adder; the adder may produce intermediate values that are not to be stored before it produces the final value that the latch is to accept. A general object of this invention is to provide a new and improved gated strobing latch.

A more specific object of the invention is to provide a new and improved gated strobing latch that produces output transitions only as the strobe pulse rises (arbitrarily). The output is kept unchanged until the next rising edge of the strobe pulse, and both the rising and falling edges of the output waveform are aligned with the rising edge of the strobe pulse. Another object is to provide a new and improved gated strobing latch that responds to the level of input signals rather than to the change or direction of change of level; a latch with this characteristic can be called a D.C. latch. The two objects of this paragraph present related problems because capacitors and A.C. circuit techniques are well suited to sensing the rising edge of a strobing pulse but the capacitors present problems that make them undesirable in high speed logic circuits.

Another more specific object of this invention is to provide a new and improved gated strobing latch for an asynchronous system. In an asynchronous system the strobe pulse width varies according to the time needed to complete one operation before going on to the next; in contrast, in a synchronous system the strobing pulses are regularly spaced apart far enough to allow sufficient time for the longest operation. Thus a latch for an asynchronous system must be made to operate on cycles that are shorter than cycles of a synchronous system. The gated strobing latch of this invention is made to accept data during a very short portion of the strobing period. A related object is to provide a gated D.C. strobing latch that accepts data that is gated in from one of several sources; switching between sources requires appreciable portions of the strobe period and the feature of the latch that it accepts data during a short portion of the strobe period helps to achieve this goal.

The gated D.C. strobing latch of this invention can be analyzed as two latches. The first latch receives input data and the second latch receives the output of the first latch and produces the circuit output. Both latches receive strobing pulses. The first latch is made to respond to the strobe pulse to accept data during the down (arbitrarily) level portion of the strobe pulse and to keep its output invariant during the up portion. The second latch is made to respond oppositely to the strobe pulse so that it accepts data during the up portion of the strobe period (when the first latch is controlled to hold its state) and it holds data during the down portion (when the output of the first latch may vary). Thus the circuit output value changes only at the beginning of the up portion of the strobe period, when the second latch initially responds to the input from the first latch.

In the preferred embodiment of the invention the circuit is not made up of two discrete latches; instead, some components function advantageously in both latch groups.

The drawing and the detailed description of the invention will suggest other desirable goals in a gated latch, problems in achieving these goals, and corresponding features of the gated latch of this invention.

In the drawings FIG. 1 is a schematic of the gated latch of this invention.

FIG. 2 is an excitation matrix of the circuit of FIG. 1.

FIG. 3 is a schematic of a second embodiment of the circuit of this invention.

The gated latch of FIG. 1 receives a strobing pulse S on an input line 10, data inputs $D_1$, $D_2$ on input lines 11, 12 and corresponding gating inputs $G_1$, $G_2$ on lines 13, 14. The latch responds to these inputs to produce an output $z$ on a line 15.

Preferably, as the drawing illustrates, the latch is formed of logic blocks of the type that form both the OR function and its complement, the OR Invert function; logic blocks of the preferred type also permit wired connections of the two outputs that perform an AND logic function and a wired connection of the true outputs that perform an OR logic function. One well known circuit of this type comprises a plurality of transistors having their emitter terminals connected together to conduct in circuit with a single resistor; one transistor has its base terminal connected to a point of reference potential and produces the OR function at its collector terminal; the other transistors have their base terminals connected to receive input signals and have their collector terminals connected together to form the OR Invert function. Other suitable logic blocks are well known.

Preferably the data and gate inputs are provided by circuits of the type described in the preceding paragraph and the gate inputs 13, 14 are connected to control the associated data inputs 11, 12 by means of wired connections forming an AND function illustrated in the drawing by functional boxes 16, 17, having outputs 18, 19. The gate signals are controllable to apply data to only one line 18, 19 at a time and in the description of the operation of the latch later, the data will be represented by a symbol D on line 18.

An OR circuit 21 is connected to receive the strobe pulse on line 10 and to produce true and complement values on lines 22, 23 that are applied to other components of the circuit.

The portion of the circuit responding to the signals on lines 18, 19, 22 and 23 comprises in effect two latches 25, 26. The first latch 25 receives the data D and the strobe pulse and produces an output $y$ on a line 29. To provide latching action, the first latch 25 is also connected to receive a signal on a line 30 that is a function of the output $y$ on line 29 (specifically $S\bar{y}$).

With the simplification of the data inputs already described and other simplifications that will be described later, the first latch 25 can be defined by the following excitation function $Y=D\bar{S}+y(S+D)$. (The excitation function of the latch is the output value called for by the input values, including the existing value of the feedback from the latch at output; when $Y\neq y$, the latch is in a transition state in which changes in the internal variables of the latch will lead to a stable state in which $Y=y$.) In summary, the output value $y$ follows the value of the data D on line 18 while the strobe pulse S is down and the latch has a hold state when the strobe pulse is up.

In the preferred embodiment of FIG. 1, three OR circuits 31, 32, 33, a time delay 35 and a wired OR connection 36 perform the latch function described in the last paragraph. The interconnections of these elements can be understood easily by rewriting the excitation function in its complementary form $\overline{Y}=\overline{SD}+\overline{y}S$. This inverted value appears on line 40 at the output of OR connection 36 and it is inverted by OR Invert circuit 32. The OR connection 36 corresponds to the + sign in the complemented form of the equation and its two inputs 30, already mentioned, and 41 correspond to the two products in the complemented function. OR circuit 33 receives the complemented strobe pulse on line 23 and the first latch output on a branch of line 29 and produces the value $\overline{S}y$ on line 30. OR circuit 31 receives the strobe pulse on a branch of line 22 and the data of lines 18 and 19 produces at its output line 43 the other product in the complemented equation, $\overline{SD}$. The time delay 35 receives the signal on line 43 and produces a delayed signal on line 41. The delay is indicated by an asterisk. It will simplify understanding the circuit to first consider that time delay 35 is set to introduce a zero delay.

The second latch 26 receives the signal $y$ on line 29 and the strobe pulse and its complement on line 23 and a branch of line 22 and produces the circuit output $z$ on line 15. This latch has the excitation function $$Z=zy+Sy+z\overline{S}$$

As the excitation function illustrates, the second latch holds its value while the strobe pulse is down and it accepts the value on the $y$ output line 29 when the strobe pulse is up.

Three OR circuits, 33 already mentioned as part of the first latch, 48 and 49 and a wired AND connection 50 cooperate to produce the latch function described in the preceding paragraph. The interconnection of these elements can be understood by rewriting the excitation function in the form $Z=(z+S)(\overline{S}+y)(y+z)$. The AND connection 50 performs a function indicated by the three products and the three OR circuits 33, 48, 49 form the sums within the parenthesis. As the drawing illustrates, OR circuit 48 receives the circuit output $z$ on a branch of line 52 and a strobe pulse S on a branch of line 22. OR circuit 33 receives a complemented strobe pulse on a line 54 and the $y$ input on a branch of line 29; OR circuit 49 receives the $y$ input on another branch of line 29 and receives the $z$ output signal on another branch of line 52.

The excitation matrix of FIG. 2 illustrates the operation of the circuit for the simplified case that the time delay of component 35 is zero value. The four columns represent the four possible states of the strobe pulse on line 10 and the data on line 18. As is usual, changes are made to only one value S or D at a time to produce changes only between adjacent columns. The rows represent the values of line 29 which is the output of the first latch and line 15 which is the circuit output. Thus when the circuit condition is defined by the lower two rows, the output has a one value and when it is defined by the upper two rows the circuit output 15 has a zero value. The values written within the matrix are the circuit output values called for by the state of the primary variables S and D of the associated column and the present latch output values $y$, $z$ of the associated row (called the excitation). Where the latch values that are called for (Y, Z) differ from the actual circuit values ($y$, $z$) a transition is generated that carries the internal variables $y$ and $z$ to a stable condition in the same column in which the excitation value equals the value of the internal variables. The stable states are circled in FIG. 2.

For each value of $z$ in FIG. 2 there is one row with three stable states and only one unstable state, and there is another row with a single stable state that is adjacent the unstable state of the first row and has the same excitation value. Consequently there is only exit from a three stable state row: into the single stable state row for which the internal variable $y$ changes but the circuit output $z$ is held invariant. A row with three stable states can be called a normal operating row and a row with one stable state can be called a preparatory row.

The transitions from the normal rows to the preparatory rows occur only in the columns $S=0$; in other words, the output $z$ is held invariant while the strobe is up and it is held invariant while the strobe is down; changes in the internal variable $y$ occur as the data input D changes. As will be explained next, transitions in the output value $z$ occur only on transitions of S.

There are two exits from a preparatory row; one of these is a return to the associated normal row when the data value D equals the circuit output value $z$, discussed in the preceding paragraph. Another transition from a preparatory row occurs as the strobe pulse changes from 0 to 1; thus transitions in the value of the circuit output $z$ occur from 0 to 1 as the primary variables change from $S=0$ $D=1$ to $S=1$ $D=1$, and a change from $z=1$ to $z=0$ occurs when the primary variables change from $S=0$ $D=0$ to $S=1$ $D=0$. The time delay 35 is given a delay that is appropriate for the operation of the circuit during the transition in which S rises and $z$ falls. During this transition $y=0$; that is, either line 30 or line 41 at the input of OR circuit 3 has a one value. In the transition line 30 has the value S since $\overline{y}=1$ and line 41 has the value $\overline{S}$ since $\overline{D}=1$; thus line 41 falls and line 30 rises in this transition. Delay 35 is given a value to make line 30 rise before line 41 falls.

In the circuit of FIG. 3 the two latches are identical to the latches of FIG. 1 and corresponding components have the same numbers. The circuit for applying inputs to the two latches is different in that the circuit receives only data and gate signals D1, D2, G1, G2. A circuit comprising a first time delay 60 connected to receive signal G1 on a branch of line 13, a time delay 61 connected to receive gating signal G2 on a branch of line 14, and an OR circuit 62 connected to receive the outputs of time delays 60, 61. Thus after either gate signal G1 or G2 is raised, OR circuit 62 produces a rising strobe pulse on its output line 22. As the circuit of FIG. 1, wired AND connections represented by functional boxes 16, 17 connect the gate inputs to control the associated data input. To isolate these wire connections 16, 17 from the time delay elements 60, 61, suitable isolating means, illustrated as an OR circuit, are connected between the circuit input lines 13, 14 and the corresponding inputs 66, 67 to the wired AND connection. The time delay of elements 60, 61 are made equal to the circuit delays in the circuit of the data and gate inputs. Thus, the operation of the circuit of FIG. 3 can be understood from the excitation matrix of FIG. 2 by recognizing that the rise and fall of the strobe pulse in FIG. 2 corresponds to the rise and fall of gating signals applied to the circuit of FIG. 3.

From the detailed description of two embodiments of the invention, those skilled in the art will recognize a wide variety of components that can be used to form the circuit, variations in the specific logic functions that are illustrated and many applications for the circuits of this invention within the spirit of the invention and the scope of the claims.

What is claimed is:

1. A circuit for synchronizing data in an asynchronous system, comprising, means providing a strobing signal having a first level during a first portion of each strobing period and having a second level during the rest of each strobing period, a first latch connected to receive said strobing signal and a data signal and having a sequential logic function to produce an output that is a function of said data input during said first portion of a strobing period and is invariant during said second portion of each strobing period, a second latch connected to receive said strobing signal and the output of said first latch and having a logic function to produce an output that is a function of the output of said first latch during the portion of said strobing period in which said first latch output is invariant and is invariant during the portion of said strobing period when said first latch output is a function of said data signal, whereby transitions in data at the output of said second latch occur only with transitions in said strobing signal from said first level to said second level.

2. A circuit according to claim 1 in which said first latch comprises first and second logic means having their inputs and outputs interconnected to form a sequential circuit operable according to an input at said first logic means that is a function of said data and strobing signals and an input at said second logic means that is a complementary function of said strobing signal, said first logic means producing at its interconnected output said first latch output.

3. A circuit according to claim 2 in which said first logic means includes a first logic block connected to form a logic function of said data and strobing signal inputs and a second logic block connected to receive the output of said first logic block and said interconnected output of said second logic means.

4. A circuit according to claim 3 in which said second latch is connected to respond to the interconnected output of said first logic means and to the complement of said interconnected output of said second logic means whereby said second logic means functions in said first latch and in said second latch.

5. A circuit according to claim 4 formed of logic blocks of the type that produce an output that can be represented as an OR function and a complementary output that can be represented as an OR Invert function and the connection of the OR output of a plurality of said blocks forms an AND logic function.

6. A circuit according to claim 5 in which said second logic means comprises a third of said logic blocks having its OR output connected to function in said second latch and said complement output connected to an input of said second logic block.

7. A circuit according to claim 6 including a time delay connected between the output of said first logic block and the associated input of said second logic block to provide an overlap of inputs to said second block when the output of said second block is an OR function of said strobing signal and its complement and said second block output is to be held invariant on a transition of said strobing signal.

8. A circuit according to claim 7 in which said second latch comprises a fourth logic block connected to receive said second latch output and said strobing signal and a fifth logic block connected to receive said first latch output and said second latch output, and means connecting the OR output of said third, fourth and fifth logic blocks to form said latch output.

No references cited.

ARTHUR GAUSS, *Primary Examiner.*

R. H. PLOTKIN, *Assistant Examiner.*